(12) United States Patent
Norton et al.

(10) Patent No.: US 12,323,407 B2
(45) Date of Patent: *Jun. 3, 2025

(54) CLIENT CERTIFICATES TO COMMUNICATE TRUSTED INFORMATION

(71) Applicant: Blackhawk Network, Inc., Pleasanton, CA (US)

(72) Inventors: Derk Norton, Pleasanton, CA (US); Tushar Vaish, Milpitas, CA (US); Jeff Webb, Pleasanton, CA (US)

(73) Assignee: Blackhawk Network, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/402,842

(22) Filed: Jan. 3, 2024

(65) Prior Publication Data

US 2024/0187394 A1     Jun. 6, 2024

Related U.S. Application Data

(63) Continuation of application No. 17/192,705, filed on Mar. 4, 2021, now Pat. No. 11,936,639, which is a
(Continued)

(51) Int. Cl.
*H04L 29/06* (2006.01)
*H04L 9/40* (2022.01)

(52) U.S. Cl.
CPC ...... *H04L 63/0807* (2013.01); *H04L 63/0823* (2013.01)

(58) Field of Classification Search
CPC ............ H04L 63/0807; H04L 63/0823
See application file for complete search history.

(56) References Cited

U.S. PATENT DOCUMENTS

| 1,429,347 A | 9/1922 | Hough |
| 6,944,761 B2 | 9/2005 | Wood et al. |

(Continued)

FOREIGN PATENT DOCUMENTS

WO     WO-03021464 A2 *   3/2003   ......... H04L 63/0272

OTHER PUBLICATIONS

Merriam-Webster, "Can I Definition of Can by Merriam-Webster", viewed on Mar. 2, 2016, https://www.merriam-webster.com/dictionary/can.

(Continued)

*Primary Examiner* — Mahfuzur Rahman
(74) *Attorney, Agent, or Firm* — Barnes & Thornburg LLP; Jerry C. Harris, Jr.

(57) ABSTRACT

A device comprises: a receiver configured to receive a client certificate; a processor coupled to the receiver and configured to: authenticate the client certificate, extract, in response to the authentication, attributes from the client certificate, and create, in response to the extraction, a message comprising reformatted attributes based on the attributes, wherein the reformatted attributes can be trusted; and a transmitter coupled to the processor and configured to transmit the message. A device comprises: a processor configured to: process a client certificate comprising a certificate identifier (ID) attribute, a tenant ID attribute, and a role ID attribute, and package the client certificate in a request for a shared service; and a transmitter coupled to the processor and configured to transmit the request.

13 Claims, 6 Drawing Sheets

Related U.S. Application Data continuation of application No. 16/227,147, filed on Dec. 20, 2018, now Pat. No. 10,958,636, which is a continuation of application No. 14/211,640, filed on Mar. 14, 2014, now Pat. No. 10,164,962.

(60) Provisional application No. 61/800,548, filed on Mar. 15, 2013.

(56) References Cited

U.S. PATENT DOCUMENTS

| | | | |
|---|---|---|---|
| 7,117,359 B2 | 10/2006 | Wood et al. | |
| 7,325,128 B2 | 1/2008 | Wood et al. | |
| 7,430,755 B1 | 9/2008 | Hughes et al. | |
| 7,506,368 B1 | 3/2009 | Kersey et al. | |
| 7,716,077 B1* | 5/2010 | Mikurak | G06Q 10/0631 705/7.12 |
| 8,104,075 B2* | 1/2012 | Spector | G06F 21/604 726/1 |
| 8,230,505 B1* | 7/2012 | Ahrens | H04L 63/168 705/5 |
| 8,291,490 B1 | 10/2012 | Ahmed et al. | |
| 8,452,956 B1 | 5/2013 | Kersey et al. | |
| 8,548,467 B2* | 10/2013 | Vanderveen | H04W 12/50 455/410 |
| 8,826,010 B2* | 9/2014 | Rescorla | H04L 9/3268 713/158 |
| 8,843,997 B1* | 9/2014 | Hare | H04L 63/0815 709/200 |
| 9,521,119 B2* | 12/2016 | Leibovitz | H04L 63/08 |
| 10,382,202 B1 | 8/2019 | Ohsie et al. | |
| 11,936,639 B2* | 3/2024 | Norton | H04L 63/0823 |
| 2002/0016777 A1* | 2/2002 | Seamons | H04L 63/0823 705/76 |
| 2003/0046586 A1* | 3/2003 | Bheemarasetti | H04L 63/08 726/15 |
| 2003/0073406 A1* | 4/2003 | Benjamin | H04L 67/12 340/901 |
| 2004/0225897 A1 | 11/2004 | Norton | |
| 2005/0050362 A1 | 3/2005 | Peles | |
| 2006/0259762 A1* | 11/2006 | Tanimoto | H04L 63/126 713/156 |
| 2007/0150737 A1 | 6/2007 | Parupudi et al. | |
| 2007/0192557 A1* | 8/2007 | Kezuka | G06F 21/80 711/164 |
| 2007/0288247 A1* | 12/2007 | Mackay | G06Q 10/00 705/325 |
| 2008/0046987 A1* | 2/2008 | Spector | G06F 21/604 726/6 |
| 2009/0198651 A1* | 8/2009 | Shiffer | G06F 16/00 |
| 2009/0198670 A1* | 8/2009 | Shiffer | G06F 16/245 707/999.005 |
| 2009/0198689 A1* | 8/2009 | Frazier | G06F 16/13 |
| 2010/0017859 A1 | 1/2010 | Kelly et al. | |
| 2010/0132016 A1* | 5/2010 | Ferris | H04L 63/101 726/4 |
| 2010/0306393 A1 | 12/2010 | Appiah et al. | |
| 2011/0126002 A1* | 5/2011 | Fu | H04L 63/0823 713/159 |
| 2011/0289581 A1 | 11/2011 | Gourevitch et al. | |
| 2012/0266231 A1* | 10/2012 | Spiers | G06F 9/45533 726/12 |
| 2014/0052877 A1* | 2/2014 | Mao | H04L 61/5007 709/245 |
| 2014/0068743 A1* | 3/2014 | Marcus | H04L 63/0815 726/8 |
| 2014/0075501 A1 | 3/2014 | Srinivasan et al. | |
| 2014/0075565 A1 | 3/2014 | Srinivasan et al. | |
| 2014/0101299 A1 | 4/2014 | Cherel et al. | |
| 2014/0164776 A1* | 6/2014 | Hook | G06F 21/6218 713/171 |
| 2016/0044035 A1 | 2/2016 | Huang | |
| 2021/0194865 A1* | 6/2021 | Norton | H04L 63/0807 |

OTHER PUBLICATIONS

Merriam-Webster, "May I Definition of May by Merriam-Webster", viewed on Mar. 2, 2016, https://www.merriam-webster.com/dictionary/may.

* cited by examiner

CLIENT CERTIFICATES TO COMMUNICATE TRUSTED INFORMATION

CROSS-REFERENCE TO RELATED APPLICATION

This application is a continuation application of and claims priority to U.S. patent application Ser. No. 17/192,705 filed Mar. 4, 2021, which is a continuation application of and claims priority to U.S. patent application Ser. No. 16/227,147 filed Dec. 20, 2018, which is a continuation of and claims priority to U.S. patent application Ser. No. 14/211,640 filed Mar. 14, 2014, which claims priority to U.S. Provisional Application No. 61/800,548 filed Mar. 15, 2013 by Derk Norton, et al., and titled "Method of Client Authentication," each of which is incorporated by reference.

This application also incorporates by reference U.S. patent application Ser. No. 12/584,861 filed Sep. 14, 2009 by Edward R. Kelly, et al., and titled "Authentication System for Networked Computer Applications"; U.S. patent application Ser. No. 12/217,005 (now U.S. Pat. No. 8,291,490) filed Jun. 30, 2008 by Zahid N. Ahmed, et al., and titled "Tenant Life Cycle Management for a Software as a Service Platform"; U.S. patent application Ser. No. 11/533,296 (now U.S. Pat. No. 7,325,128) filed Sep. 19, 2006 by David L. Wood, et al., and titled "Log-On Service Providing Credential Level Change without Loss of Session Continuity"; U.S. patent application Ser. No. 11/224,675 (now U.S. Pat. No. 7,117,359) filed Sep. 12, 2005 by David L. Wood, et al.," and titled "Default Credential Provisioning"; U.S. patent application Ser. No. 10/643,813 (now U.S. Pat. No. 6,944,761) filed Aug. 19, 2003 by David L. Wood, et al., and titled "Log-On Service Providing Credential Level Change without Loss of Session Continuity"; and U.S. patent application Ser. No. 10/431,097 filed May 7, 2003 by Derk D. Norton and titled "Client-Server Architecture Incorporating Secure Tuple Space."

BACKGROUND

The disclosure generally relates to computer networks employing a client-server architecture and more particularly to authentication, authorization, and auditing within such networks.

Computer networks may employ various architectures. One such architecture is a client-server architecture. In a client-server network, a client, which may be an end user, may desire to use a service on an application server. Using a client application on the client, the client may send to the application server a request for the service. In reply, the application server may send to the client a response from the service or a resource associated with the service. A gateway server may be located between the client and the application server and may function as an interface between the client and the application server. The requests and responses may follow various protocols and require authentication and authorization. In addition, the application server may audit, or log, the requests and responses.

SUMMARY

In one embodiment, the disclosure includes a device comprising: a receiver configured to receive a client certificate; a processor coupled to the receiver and configured to: authenticate the client certificate, extract, in response to the authentication, attributes from the client certificate, and create, in response to the extraction, a message comprising reformatted attributes based on the attributes, wherein the reformatted attributes can be trusted; and a transmitter coupled to the processor and configured to transmit the message.

In another embodiment, the disclosure includes a device comprising: a processor configured to: process a client certificate comprising a certificate identifier (ID) attribute, a tenant ID attribute, and a role ID attribute, and package the client certificate in a request for a shared service; and a transmitter coupled to the processor and configured to transmit the request.

In yet another embodiment, the disclosure includes a method comprising: receiving a client certificate; authenticating the client certificate based on a signature in the client certificate; authorizing, in response to the authenticating, the client to access a shareable service; extracting, in response to the authenticating, attributes from the client certificate; and creating, in response to the extracting, a message comprising reformatted attributes based on the attributes, wherein the reformatted attributes can be trusted.

DETAILED DESCRIPTION

When a client requests a service from an application server, the client may request a shareable service, meaning that multiple partners are associated with the service. Shareable services may be used to, for example, manage business data and perform business transactions. First, it is important that the client be trusted before processing the client's request. Second, because shareable services are shared among multiple partners, it is important for a gateway to distinguish among the partners and to be able to maintain data privacy. As an example, the client may request a service associated with a first partner. In that case, the application server may query data for the first partner and not query data for a second partner, which might compete with the first partner, so that the application server does not divulge to the second partner data that is confidential to the first partner. The application server's access to, but distinction among, multiple partners may be referred to as multi-tenancy.

Disclosed herein are techniques for addressing the above issues. Specifically, first, the disclosure may provide for authenticating and authorizing a client, and therefore trusting the client, before processing the client's request. The request may comprise a client certificate, which may contain encoded in it at least three attributes. The attributes may include a certificate identifier (ID) attribute, a tenant ID attribute, and a role ID attribute. Second, the tenant ID attribute may identify a specific partner and therefore prevent data confidential to that partner from being divulged to other partners. The role ID may implement role-based access control, which may refer to identifying what role the client application may fulfill while using a shareable service and prohibiting the client application from attempting to fulfill any other roles.

Figure 1:
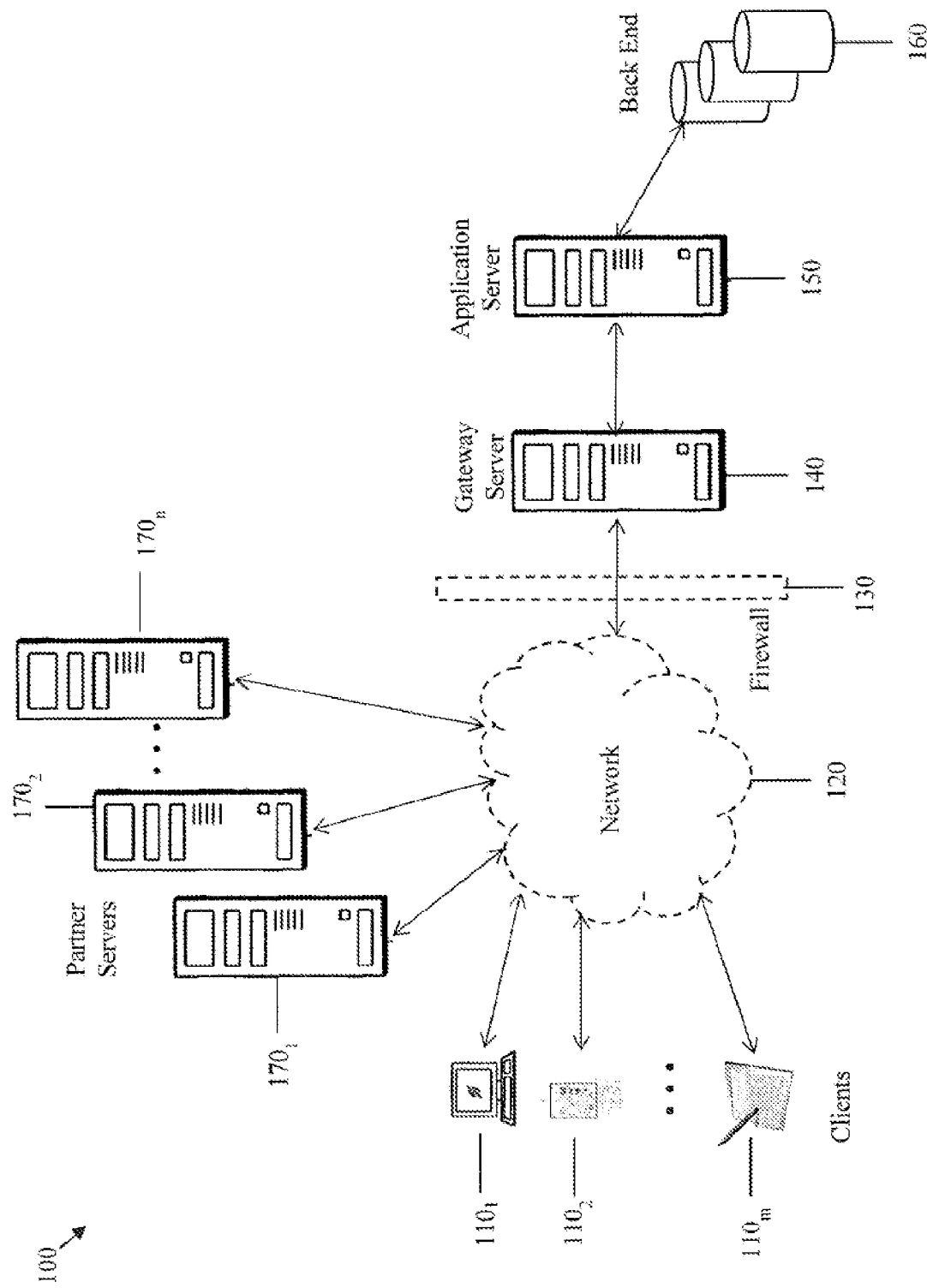
FIG. 1 is a schematic diagram of a client-server network according to an embodiment of the disclosure.

FIG. 1 is a schematic diagram of a client-server network 100 according to an embodiment of the disclosure. The network 100 may comprise clients $110_{1-m}$ and partner servers $170_{1-n}$ communicatively coupled to a gateway server 140 via a network 120 and through a firewall 130. The gateway server 140 may be communicatively coupled to an application server 150, which may, in turn, be communicatively coupled to a back end 160. The components of the network 100 may be arranged and coupled as shown or in another suitable manner.

The clients $110_{1-m}$ may be a notebook computer, tablet computer, desktop computer, mobile telephone, or other device suitable for sending communication to, and receiving communication from, the network 120. M may be any positive integer. The clients $110_{1-m}$ may be associated with users (not shown), who may operate the clients $110_{1-m}$ using a graphical user interface (GUI). In addition, the clients $110_{1-m}$ may comprise a client application (not shown), which may be any software application coded in any format for purposes of carrying out designated tasks based on automation or user input. The users may use the client application using the GUI. The client application may be used to access a shareable service on the application server 150.

The network 120 may be any network suitable for allowing communication among the clients $110_{1-m}$, the gateway server 140, and the partner servers $170_{1-n}$. For example, the network 120 may be the Internet or a mobile telephone network. The network 120 may allow communication along wired or wireless channels.

The firewall 130 may be a software-based or hardware-based system suitable for controlling communication to and from the server gateway 140. The firewall 130 may control communication by applying rules to communications. The rules may be set by an administrator (not shown) via the gateway server 140, the application server 150, or another suitable device. The firewall 130 may include the gateway server 140.

The gateway server 140 may be a hardware server or other device suitable for serving as an interface between the clients $110_{1-m}$ and the partner servers $170_{1-n}$ on the one hand and the application server 150 on the other hand. The gateway server 140 may translate and convert network protocols in order to allow such communication. By routing all communication to the application server 150 through the gateway server 140, the gateway server 140 may make authentication and authorization of the clients $110_{1-m}$ simpler. In order to authenticate and authorize the clients $110_{1-m}$, the gateway server 140 may require bi-directional Hypertext Transfer Protocol Secure (HTTPS) or other protocol authentication using mutual certificate-based Secure Sockets Layer (SSL) or Transport Layer Security (TLS), or another suitable form of authentication. HTTPS, SSL, and TLS are incorporated by reference.

The application server 150 may be a hardware server or other device suitable for storing data and providing that data to requesting clients. The application server 150 may be dedicated to providing data associated with a single service or with multiple services. When another device, for instance one of the clients $110_{1-m}$, requests a service from the application server 150, the application server 150 may retrieve from the back end 160 a resource associated with the service.

The back end 160 may be a device or devices suitable for storing the resources associated with the service. The back end 160 may reside within or without the application server 150. The back end 160 may not run independently, but may instead require commands from the application server 150. For example, the back end 160 may be a database operated using Structured Query Language (SQL), which is incorporated by reference, or any other suitable language or protocol.

The firewall 130, the gateway server 140, the application server 150, and the back end 160, or any combination of those components may be located in the network 120 or a portion of the network 120. Specifically, those components may be located in a cloud and operate, from the perspective of an entity associated with the application server 150, in a cloud computing environment. In other words, those components may not be physically located where the entity associated with the application server 150 resides. The cloud may, for instance, be an Amazon® cloud.

The partner servers $170_{1-n}$ may be hardware servers or other devices suitable for sending communication to, and receiving communication from, the network 120. N may be any positive integer. The partner servers $170_{1-n}$ may be associated with partners (not shown), which may be brick-and-mortar merchants such as Safeway® or Albertsons®; gift, credit, and other card issuers such as Starbucks® or Visa®; or other entities unrelated to card processing transactions. Each partner may have a specific ID associated with it. Furthermore, each partner may have multiple partner servers $170_{1-n}$ associated with it. The service described above may be a shareable service, meaning that multiple partners are associated with the service. In addition, the service may use a framework using applications that conform to representational state transfer (REST), which is incorporated by reference. Such applications may be referred to as RESTful applications.

Figure 2A:
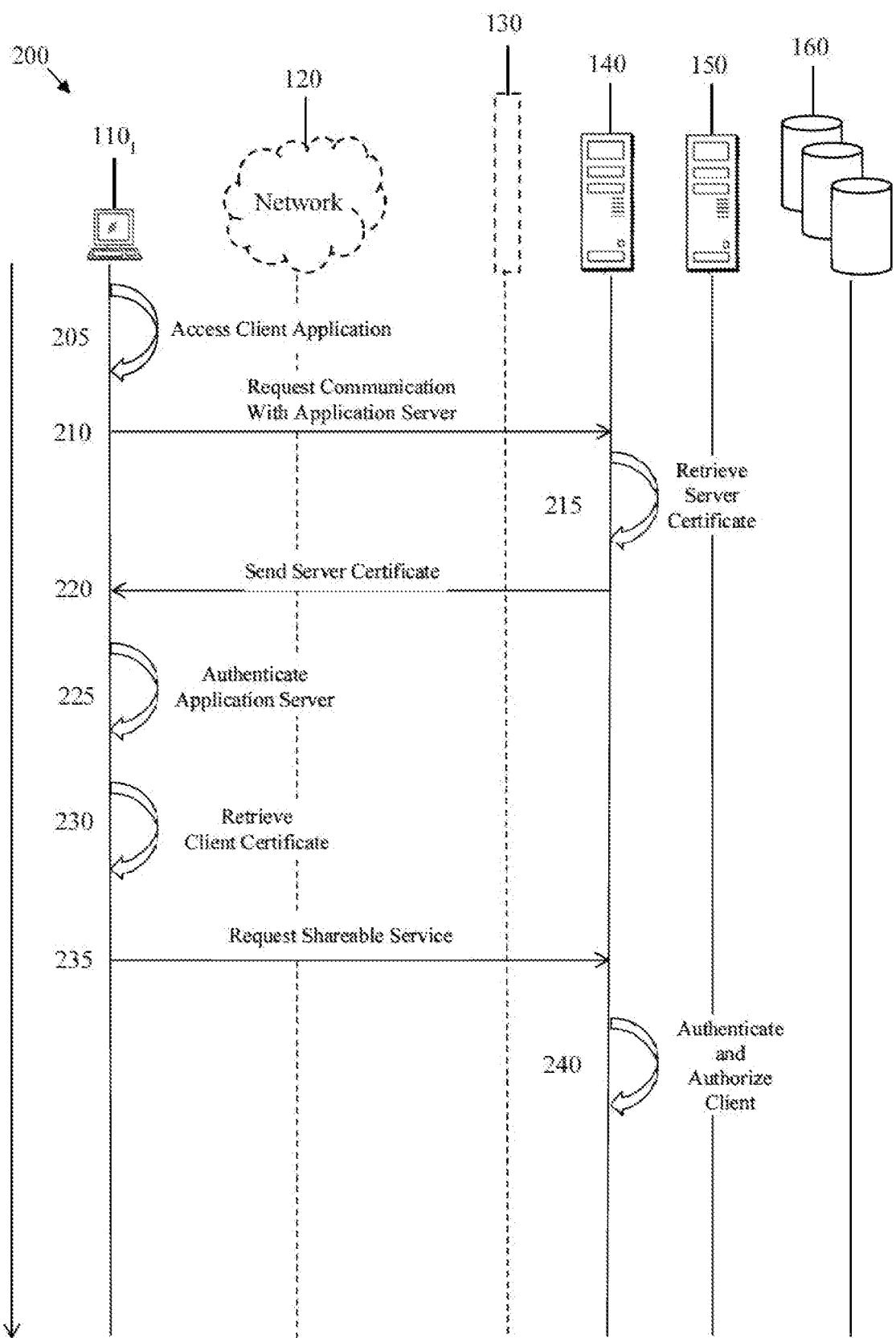
FIG. 2a is a first portion of a message sequence diagram of the network described in FIG. 1 according to an embodiment of the disclosure.

FIG. 2a is a first portion of a message sequence diagram 200 of the network 100 described in FIG. 1 according to an embodiment of the disclosure. At step 205, a user (not shown) associated with the client $110_1$ may access a client application (not shown) using a GUI (not shown) on the client $110_1$. Specifically, the user may request from the client application a service associated with the partner $170_1$. The application server 150 may, however, provide the service on behalf of the partner $170_1$. Accordingly, the client $110_1$ may begin a process of communication with the application server 150. The communication may start, however, with mutual authentication between the client $110_1$ and the gateway server 140 and with the gateway server 140 authorizing the client $110_1$.

Generally, steps 210-240 may comprise steps for mutual authentication between the client $110_1$ and the gateway server 140. The steps may comprise messages sent between the client $110_1$ and the gateway server 140, as well as among other components, such as the network 120 and the firewall 130, between the client $110_1$ and the gateway server 140. The messages may comply with SSL, TLS, or another suitable authentication protocol and be sent and received using HTTPS or another suitable communications protocol. Though steps 220-270 are shown, it may be understood that different steps may be used for SSL, TLS, or another suitable authentication protocol.

At step 210, the client $110_1$ may send a request for establishment of communication with the application server 150. For example, the client application may be an Internet browser, so the request may be the client application attempting to access a website. As another example, the client application may be a stand-alone application that directly accesses the Internet without use of a web browser. Because all communication with the application server 150 may be routed through the gateway server 140, the gateway server 140 may handle the request. At step 215, in response to the request at step 210, the gateway server 140 may retrieve a server certificate either locally or from a database.

At step 220, the gateway server 140 may send to the client $110_1$ the server certificate. At step 225, the client $110_1$ may authenticate the gateway server 140 based on the server certificate. At step 230, the client $110_1$ may retrieve a client certificate. The client $110_1$ may have previously received the client certificate from the partner server $170_1$ upon downloading the client application or at some other point. The client $110_1$ may store the client certificate either locally on the client $110_1$ or in a database accessible to the client $110_1$. The client certificate may be signed by a private certificate authority associated with the application server 150. The client certificate may have embedded within it three attributes, a certificate ID, a tenant ID, and a role ID, which are described more fully below.

At step 235, the client $110_1$ may attempt to send to the application server 150 a request for a shareable service. Once again, the gateway server 140 may handle the request. The request may include the client certificate and may be related to a partner associated with the partner server $170_1$. Alternatively, the client $110_1$ may route the request through the partner server $170_1$, which may contain the client certificate.

At step 240, the gateway server 140 may authenticate and authorize the client $110_1$. The gateway server 140 may authenticate the client $110_1$ because it received the client certificate from the client $110_1$. The client certificate may not be forged because it is signed by the private certificate authority associated with the application server 150. The gateway server 140 may therefore authorize the client $110_1$ to have access to the shareable service.

Figure 2B:
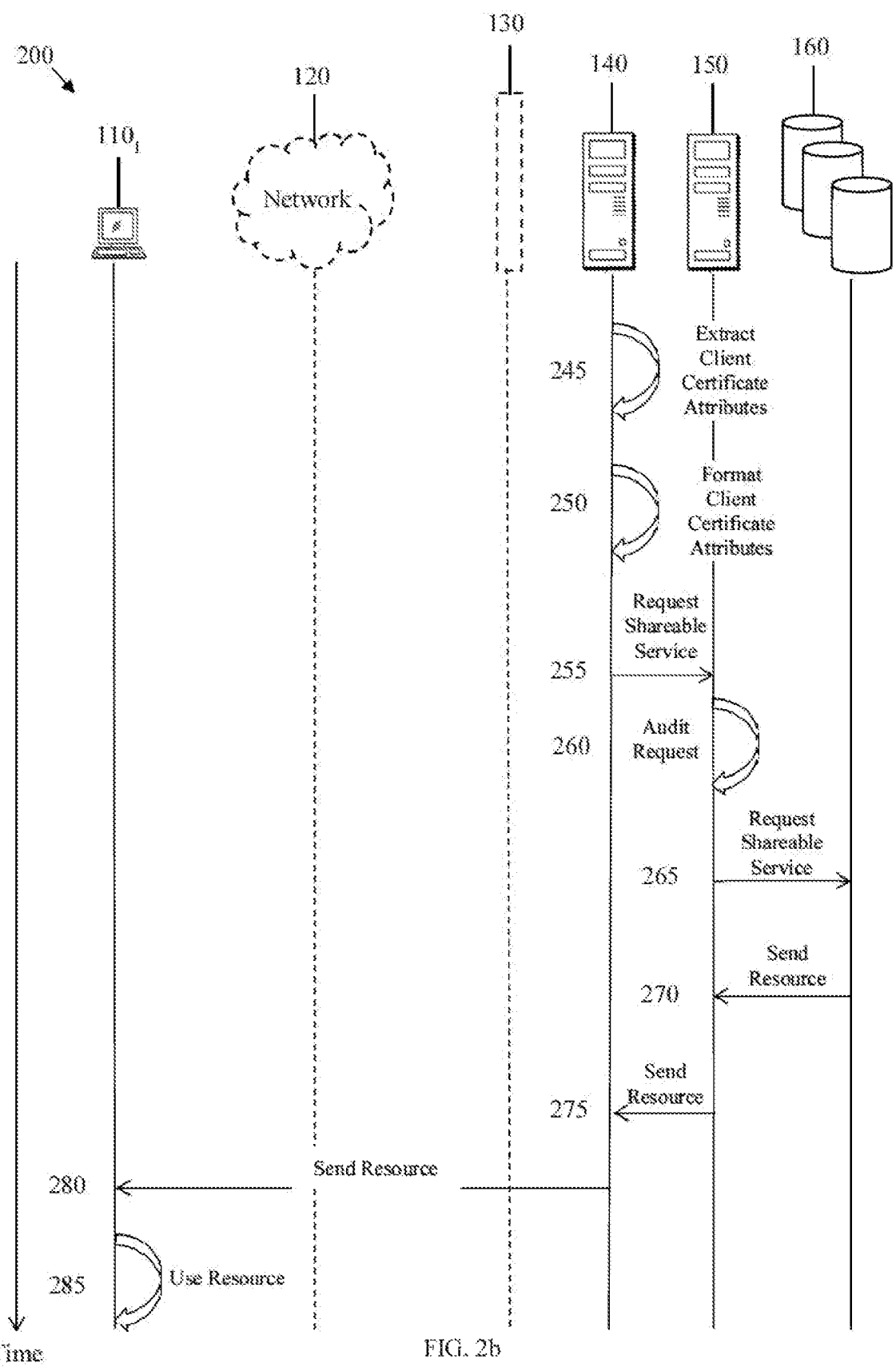
FIG. 2b is a second portion of a message sequence diagram of the network described in FIG. 1 according to an embodiment of the disclosure.

FIG. 2b is a second portion of a message sequence diagram 200 of the network 100 described in FIG. 1 according to an embodiment of the disclosure. At step 245, after authenticating and authorizing the client $110_1$, the gateway server 140 may extract the attributes from the client certificate. At step 250, the gateway server 140 may reformat the attributes into HTTPS headers or an HTTPS body in an Extensible Markup Language (XML), JavaScript Object Notation (JSON) or other suitable message. The message may be in human readable format. At step 255, the gateway server 140 may send to the application server 150 a request for the shareable service. The request may include the message comprising the attributes.

At step 260, the application server 150 may audit the certificate ID, the tenant ID, and the role ID from the request for legal, billing, or other purposes. For example, if the request is related to a financial shareable service, the application server 150 may be required by law to audit the request. In addition, the application server 150 may audit the request in order to bill the client $110_1$ for use of the shareable service. The audit data may indicate which one of the client $100_{1-m}$, for instance the client $100_1$, made which requests. The application server 150 may store audit data either locally or on the back end 160.

At step 265, the application server 150 may request data from the back end 160, which may be a resource associated with the shareable service. At step 270, the back end 160 may send to the application server 150 the resource associated with the shareable service. At step 275, the application server 150 may forward to the gateway server 140 the resource associated with the shareable service or a response to the request. At step 280, the gateway server 140 may send to the client $110_1$ the resource associated with the shareable service or a response to the request. At step 285, the client $110_1$ or the client application may use the resource or process the response.

As another example, the shareable service may be related to gift cards. A merchant may be associated with a partner server $170_1$, and a user associated with the client $110_1$ may desire to obtain a Starbucks® gift card from the partner server $170_1$. The client $110_1$ may be a notebook computer at a user's home. The user may access on the client $110_1$ a client application, which may be a web browser such as Safari®. In particular, the user may navigate to the merchant's website to obtain a Starbucks® gift card. The application server 150 may provide the shareable service. Accordingly, the partner server $170_1$ may contact the application server 150 through the gateway server 140, and the partner server $170_1$ and the gateway server 140 may authenticate each other. After authentication, the client application may send a request to the shareable service. In other words, the client application may request a gift card or a resource related to the gift card. The application server 150 may respond with a new gift card ID, time stamps associated with the transaction, or other resources associated with the shareable service. While this example relates to gift cards, it is understood that the shareable service may be any shareable or non-shareable service provided in a client-server network such as the network 100.

Figure 3:
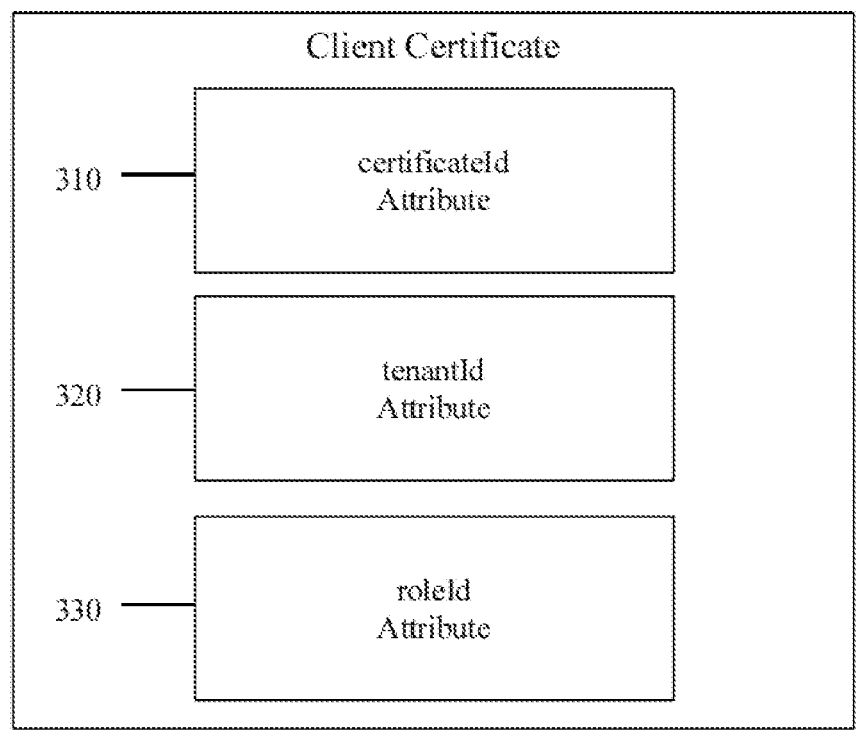
FIG. 3 is a schematic diagram of the client certificate described in FIGS. 2a and 2b.

FIG. 3 is a schematic diagram of the client certificate 300 described in FIGS. 2a and 2b. The certificate 300 may comprise a certificate ID, or certificateId, attribute 310; a tenant ID, or tenantId, attribute 320; and a role ID, or roleId, attribute 330. In a message from the client $110_1$ to the gateway server 140, the certificateId attribute 310 may be referenced as a common name (CN) attribute, the tenantId attribute 320 may be referenced as an organization (O) attribute, and the roleId attribute 330 may be referenced as an organizational unit (OU) attribute in the subject line of the client certificate 300, though other associations may be made as well. In a message from the gateway server 140 to the application server 150, the attributes may maintain their nomenclature. In addition to the certificateId attribute 310, the tenantId attribute 320, and the roleId attribute 330, the client certificate 300 may comprise additional attributes that may identify other aspects of the relationship among the client $110_1$, the gateway server 140, the application server 150, and the partner server $170_1$. A private certificate authority (not shown) associated with the gateway server 140 may issue the client certificate 300. Each partner associated with the partner servers $170_{1-n}$ may have a client certificate associated with it.

Each of the attributes may not be forged because the client certificate 300 may be signed by the private certificate authority associated with the gateway server 140. Because the attributes may not be forged, the attributes may not need to be validated, but may instead be trusted and cannot be repudiated later by the client $110_1$ or other legal party. Any additional attributes similarly may be trusted and cannot be repudiated later by the client $110_1$ or other legal party. When the gateway server 140 extracts the attributes and forwards them to the application server 150, the application server 150 may trust the attributes because they came from the gateway server 140. Each attribute may be a cryptographically random globally unique identifier (GUID), meaning that the same values may not be created twice. Because the attributes may be encoded in the client certificate 300, they may not be changed without the client certificate 300 signature being invalidated.

The certificateId attribute 310 may be an ID that is unique to the client certificate 300. In other words, every client certificate may have a different value for the certificateId attribute 310. The certificateId attribute 310 may tell the gateway server 140 and the application server 150 which one of the clients $110_{1-m}$, for instance the client $110_1$, is requesting the shareable service. Before processing the tenantId attribute 320 and the roleId attribute 330, the gateway server 140 and the application server 150 may confirm that the certificateId attribute 310 value is valid and has not been revoked. A certificateId attribute 310 value may be revoked if, for instance, the client certificate 300 has been stolen or suspected of being stolen.

The tenantId attribute 320 may be an ID that specifies which partner owns the data that the client application is attempting to access. Each partner may have a tenant ID associated with it. The tenantId attribute 320 may specify which partner data the client $110_1$ may access. Accordingly, the tenantId attribute 320 may ensure segregation of data associated with the partners. In other words, if the client certificate 300 comprises the tenantId attribute 320 and the tenantId attribute 320 indicates a first partner, then the first partner may not access the data of a second partner and no data associated with the second partner may be affected based on the client certificate 300.

The roleId attribute 330 may be an ID that helps to implement role-based access control, which may refer to identifying what role the client application may fulfill while using the shareable service and prohibiting the client application from attempting to fulfill any other roles. For example, the role may be an administrator role, a general role, or another role. The types of roles may be unlimited and may dictate what data transactions the client $110_1$ may perform. If the roleId attribute 330 has a value indicating a general role, then the client $110_1$ may have limited access to data. If, however, the roleId attribute 330 has a value indicating an administrator role, then the client $110_1$ may have nearly unlimited access to data. There may be multiple roleId attribute 330 values associated with a single tenantId attribute 320 value in separate client certificates.

Figure 4:
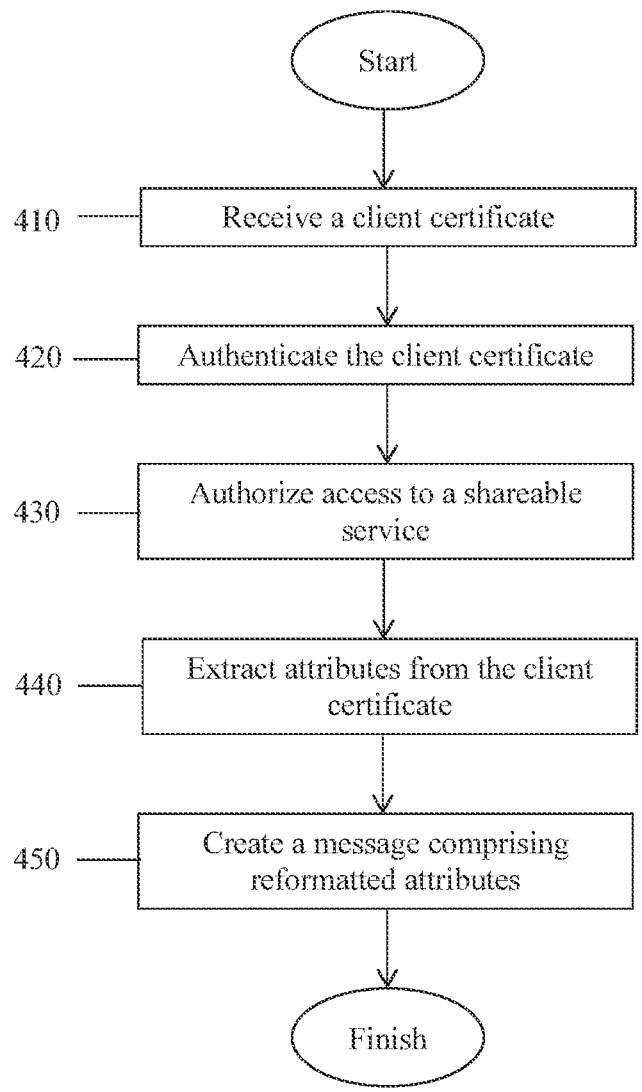
FIG. 4 is a flowchart illustrating a method of processing a client certificate according to an embodiment of the disclosure.

FIG. 4 is a flowchart illustrating a method 400 of processing a client certificate according to an embodiment of the disclosure. The method 400 may be implemented in the gateway server 140. At step 410, a client certificate may be received. The client certificate may be the client certificate 300. At step 420, the client certificate may be authenticated. The client certificate may be authenticated based on a signature in the client certificate. At step 430, access to a shareable service may be authorized. The authorization may occur in response to the authentication. The access may be authorized to one of the clients $110_{1-m}$. At step 440, attributes from the client certificate may be extracted. The extraction may be in response to the authentication. The attributes may be the certificateId attribute 310, the tenantId attribute 320, and the roleId attribute 330. At step 450, a message comprising reformatted attributes may be created. The creation may be in response to the extraction. The reformatted attributes may be based on the attributes and may be trusted based on the authentication.

Figure 5:
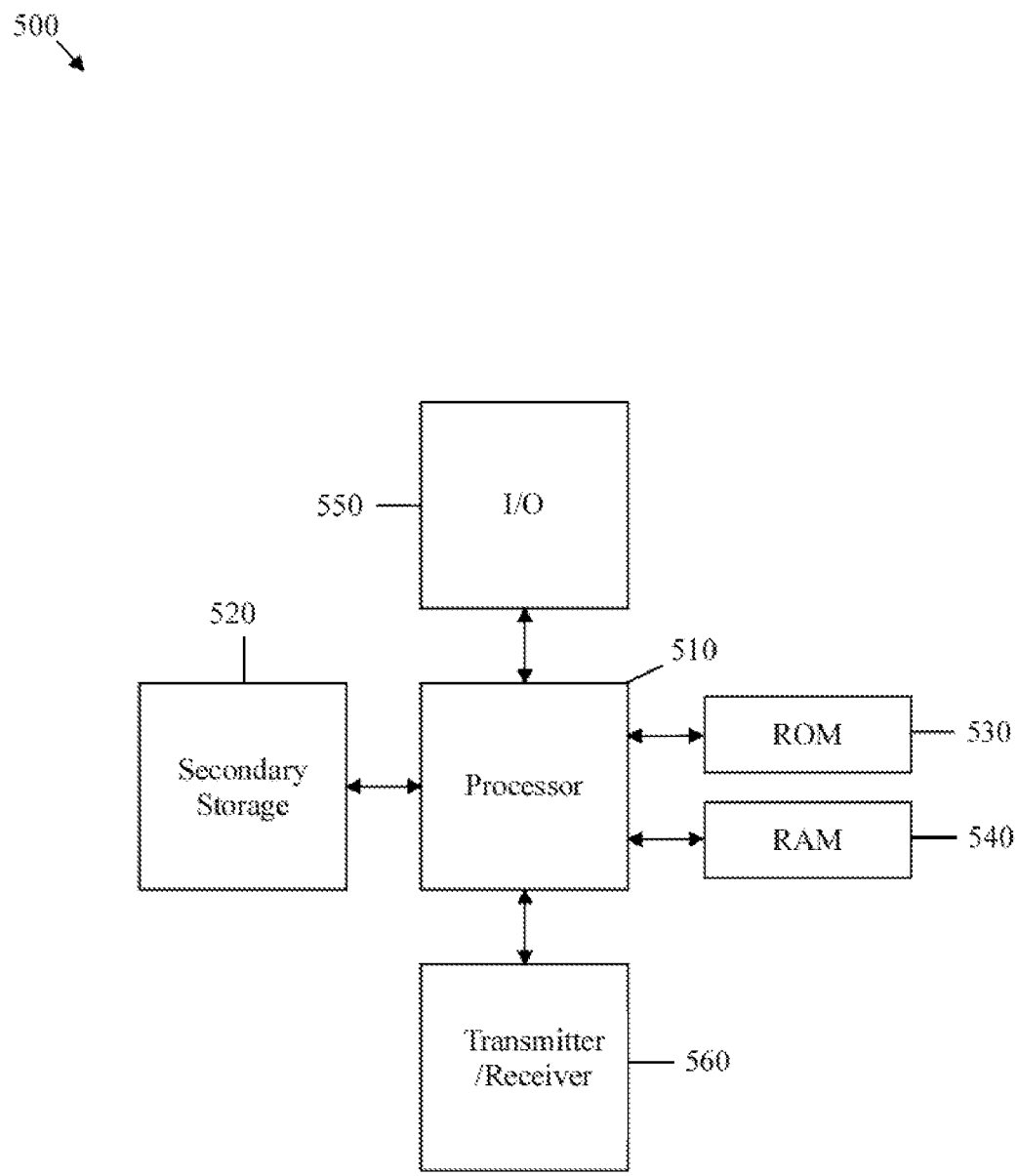
FIG. 5 is a schematic diagram of a computer system according to an embodiment of the disclosure.

FIG. 5 is a schematic diagram of a computer system 500 according to an embodiment of the disclosure. The system 500 may be suitable for implementing the disclosed embodiments, including the clients $110_{1-m}$, the gateway server 140, the application server 150, and the partner servers $170_{1-n}$. The system 500 may comprise a processor 510 that is in communication with memory devices, including a secondary storage 520, a read only memory (ROM) 530, a random access memory (RAM) 540, input/output (I/O) devices 550, and a transmitter/receiver 560. Although illustrated as a single processor, the processor 510 is not so limited and may comprise multiple processors. The processor 510 may be implemented as one or more central processor unit (CPU) chips, cores (e.g., a multi-core processor), field-programmable gate arrays (FPGAs), application specific integrated circuits (ASICs), and/or digital signal processors (DSPs), and/or the processor 510 may be part of one or more ASICs. The processor 510 may be implemented using hardware or a combination of hardware and software.

The secondary storage 520 may comprise one or more disk drives or tape drives and may be used for non-volatile storage of data and as an overflow data storage device if the RAM 540 is not large enough to hold all working data. The secondary storage 520 may be used to store programs that are loaded into the RAM 540 when such programs are selected for execution. The ROM 530 may be used to store instructions and data that are read during program execution. The ROM 530 may be a non-volatile memory device that may have a small memory capacity relative to the larger memory capacity of the secondary storage 520. The RAM 540 may be used to store volatile data and perhaps to store instructions. Access to both the ROM 530 and the RAM 540 may be faster than to the secondary storage 520.

The transmitter/receiver 560 may serve as an output and/or input device of the system 500. For example, if the transmitter/receiver 560 is acting as a transmitter, it may transmit data out of the system 500. If the transmitter/receiver 560 is acting as a receiver, it may receive data into the system 500. The transmitter/receiver 560 may take the form of modems; modem banks; Ethernet cards; universal serial bus (USB) interface cards; serial interfaces; token ring cards; fiber distributed data interface (FDDI) cards; wireless local area network (WLAN) cards; radio transceiver cards such as code division multiple access (CDMA), global system for mobile communications (GSM), long-term evolution (LTE), worldwide interoperability for microwave access (WiMAX), and/or other air interface protocol radio transceiver cards; and other well-known network devices. The transmitter/receiver 560 may enable the processor 510 to communicate with the Internet or one or more intranets. The I/O devices 550 may comprise a video monitor, a liquid crystal display (LCD), a touch screen display, or another type of video display for displaying video and may also include a video recording device for capturing video. The I/O devices 550 may also include one or more keyboards, mice, track balls, or other well-known input devices.

The ordering of steps in the various processes, data flows, and flowcharts presented are for illustration purposes and do not necessarily reflect the order that various steps must be performed. The steps may be rearranged in different orders in different embodiments to reflect the needs, desires and preferences of the entity implementing the systems. Furthermore, many steps may be performed simultaneously with other steps in some embodiments.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed. There has been described herein an systems and methods for providing a security code of an electronic stored-value card such that users may purchase, redeem, and/or exchange value associated with the electronic stored-value card (e.g., electronic value tokens residing in an electronic wallet). It will be apparent to those skilled in the art that modifications may be made without departing from the spirit and scope of the disclosure. The embodiments described are representative only, and are not intended to be limiting. Many variations, combinations, and modifications of the applications disclosed herein are possible and are within the scope of the disclosure. Accordingly, the scope of protection is not limited by the description set out above, but is defined by the claims which follow, that scope including all equivalents of the subject matter of the claims.

The invention claimed is:

1. A device comprising a processor implemented on one or more computer chips configured to:
   authenticate a client certificate, wherein the client certificate is signed by a private certificate authority associated with the device,
   extract, in response to the authentication, attributes from the client certificate, and
   create, in response to the extraction, a message comprising reformatted attributes based on the attributes, wherein the reformatted attributes comprise a certificate identifier (ID) attribute, a tenant ID attribute, and a role ID attribute, wherein the certificate ID attribute identifies the client and uniquely identifies the client certificate, wherein the tenant ID attribute is associated with partner data and specifies which partner data is client accessible, wherein the role ID attribute helps to implement role-based access control, and wherein the reformatted attributes can be trusted.

2. The device of claim 1, wherein the device is a gateway server and wherein the gateway server is configured to receive the client certificate from a client.

3. The device of claim 1, wherein the reformatted attributes can be trusted because of the authentication.

4. The device of claim 1, wherein the reformatted attributes can be trusted because the processor created the message comprising the reformatted attributes.

5. The device of claim 1, wherein the reformatted attributes are included in Hypertext Transfer Protocol (HTTP) or HTTP Secure (HTTPS) headers.

6. The device of claim 1, wherein the message is in an Extensible Markup Language (XML) or JavaScript Object Notation (JSON) format.

7. A device comprising a processor implemented on one or more computer chips configured to:
   process a client certificate's attributes to produce reformatted attributes comprising a certificate identifier (ID) attribute, a tenant ID attribute, and a role ID attribute, and include the client certificate in a request for a shared service, wherein the certificate identifier (ID) attribute identifies a client and uniquely identifies the device, wherein the device is the client, wherein the tenant ID attribute specifies which partner data is device accessible, and wherein the role ID attribute helps to implement role-based access control.

8. The device of claim 7, wherein the certificate identifier (ID) attribute, the tenant ID attribute, and the role ID attribute are globally unique identifiers (GUIDs) that are unique and cannot be forged.

9. The device of claim 7, wherein the client certificate is signed by a private certificate authority associated with a gateway server.

10. The device of claim 7, wherein the request is in an Extensible Markup Language (XML) or JavaScript Object Notation (JSON) format.

11. A method comprising:
    authenticating a client certificate based on a signature in the client certificate;
    authorizing, in response to the authenticating, access to a shareable service;
    extracting, in response to the authenticating, attributes from the client certificate; and
    creating, in response to the extracting, a message comprising reformatted attributes based on the attributes, wherein the reformatted attributes comprise a certificate identifier (ID) attribute, a tenant identifier attribute, and a role ID attribute, wherein the reformatted attributes can be trusted based on the authentication and wherein the reformatted attributes are globally unique identifiers (GUIDs) that are unique and cannot be forged, and wherein the certificate ID attribute uniquely identifies the device, the tenant ID attribute specifies which partner data is device accessible, and the role ID attribute specifies a role of the device.

12. The method of claim 11, further comprising transmitting the message.

13. The method of claim 12, further comprising receiving, in response to the transmitting, a resource associated with the shareable service.

* * * * *